(12) United States Patent
Stevens

(10) Patent No.: US 7,209,145 B2
(45) Date of Patent: Apr. 24, 2007

(54) COLOR DEVICE PROFILE HAVING A BUFFERED LOOK-UP TABLE

(75) Inventor: Michael T. Stevens, Aloha, OR (US)

(73) Assignee: Xerox Corporation, Stamford, CT (US)

( * ) Notice: Subject to any disclaimer, the term of this patent is extended or adjusted under 35 U.S.C. 154(b) by 620 days.

(21) Appl. No.: 10/816,759

(22) Filed: Apr. 2, 2004

(65) Prior Publication Data
US 2005/0219562 A1  Oct. 6, 2005

(51) Int. Cl.
G09G 5/02 (2006.01)

(52) U.S. Cl. .................. 345/601; 345/602; 345/603; 345/604

(58) Field of Classification Search ............. 345/601, 345/602, 603, 604
See application file for complete search history.

(56) References Cited

U.S. PATENT DOCUMENTS

| | | | |
|---|---|---|---|
| 5,646,752 A | 7/1997 | Kohler et al. | 358/520 |
| 5,806,081 A * | 9/1998 | Swen et al. | 715/528 |
| 5,881,209 A * | 3/1999 | Stokes | 358/1.9 |
| 5,963,201 A * | 10/1999 | McGreggor et al. | 715/722 |
| 6,008,907 A | 12/1999 | Vigneau et al. | 358/1.9 |
| 6,466,333 B1 | 10/2002 | Schoolcraft et al. | 358/1.9 |
| 6,690,489 B1 | 2/2004 | Jacob et al. | 358/1.9 |

OTHER PUBLICATIONS

Huanzhao Zeng, Primary Preservation in ICC Color Management System; Proceedings of SPIE vol. 4663, 2002, pp. 207-216.
Tsutomu Miyamoto, et al., Color Page Printers: Market View and Color Technology Trends; OKI Technical Review Issue 194 vol. 70 No. 2, Apr. 2003, pp. 14-17.

* cited by examiner

Primary Examiner—Matthew C. Bella
Assistant Examiner—Mike Rahmjoo
(74) Attorney, Agent, or Firm—Manuel Quiogue

(57) ABSTRACT

A color device profile including a buffered color look-up table having outermost nodes that replicate nodes of an inner portion that are closest to the outermost nodes, and input tonal reproduction curves having a range that is smaller than an input range associated with the buffered color look-up table and greater than an input range associated with the inner portion.

3 Claims, 6 Drawing Sheets

COLOR DEVICE PROFILE HAVING A BUFFERED LOOK-UP TABLE

BACKGROUND

The subject disclosure is generally directed to printer profiles.

Color device profiles are commonly employed to transform color image data formatted for one device color space to color image data formatted for another device color space. For example, an International Color Consortium (ICC) workflow calls for converting color image data formatted in red-green-blue (RGB) color space for a color monitor to a device independent color space called profile connection space (PCS), and then into color image data formatted in CMYK space for a color printer.

As a result of computational limitations, it may be difficult to produce clean primary and/or secondary output colors.

DETAILED DESCRIPTION

Figure 1:
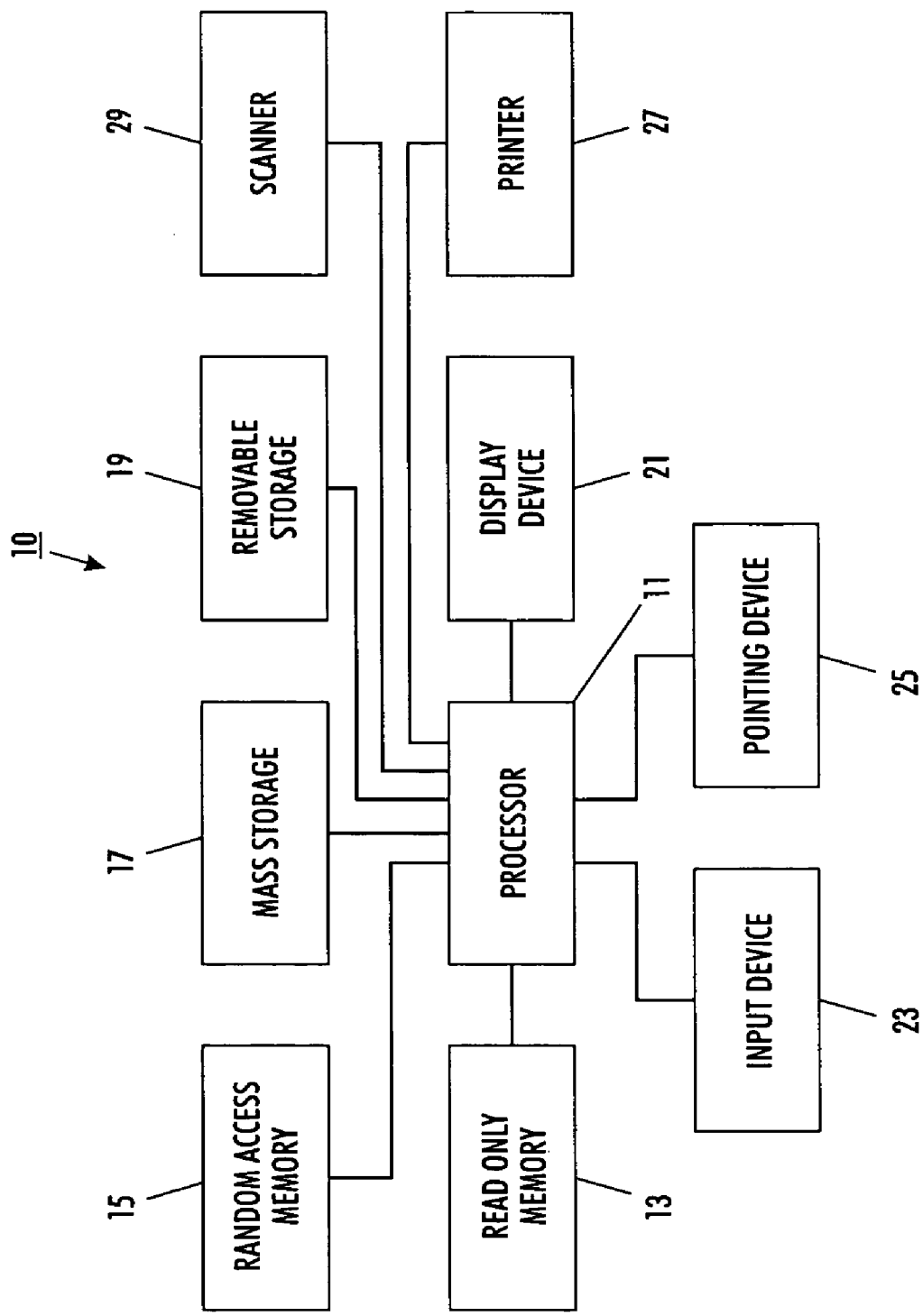
FIG. 1 is a schematic block diagram of an embodiment of a computer system in which the disclosed color transform pipeline can be employed.

FIG. 1 is a schematic block diagram of an embodiment of a computer system 10 in which the disclosed color transform pipeline can be utilized. The computer system includes a processor 11, a read-only memory 13, random access memory 15, a mass storage device 17 such as a disk drive, and a removable storage device 19 such as a DVD drive. The computer system further includes a display 21 which can be a color monitor, for example, an input device 23 such as a keyboard or touch pad for entering user commands, a pointing device 25 such as a mouse or trackball for pointing to and manipulating graphical user interfaces or other objects displayed on the display 21. The computer system 10 can be connected to a printer 27, for example via a local area network. The computer system 10 can also be connected to a scanner 29.

Figure 2:
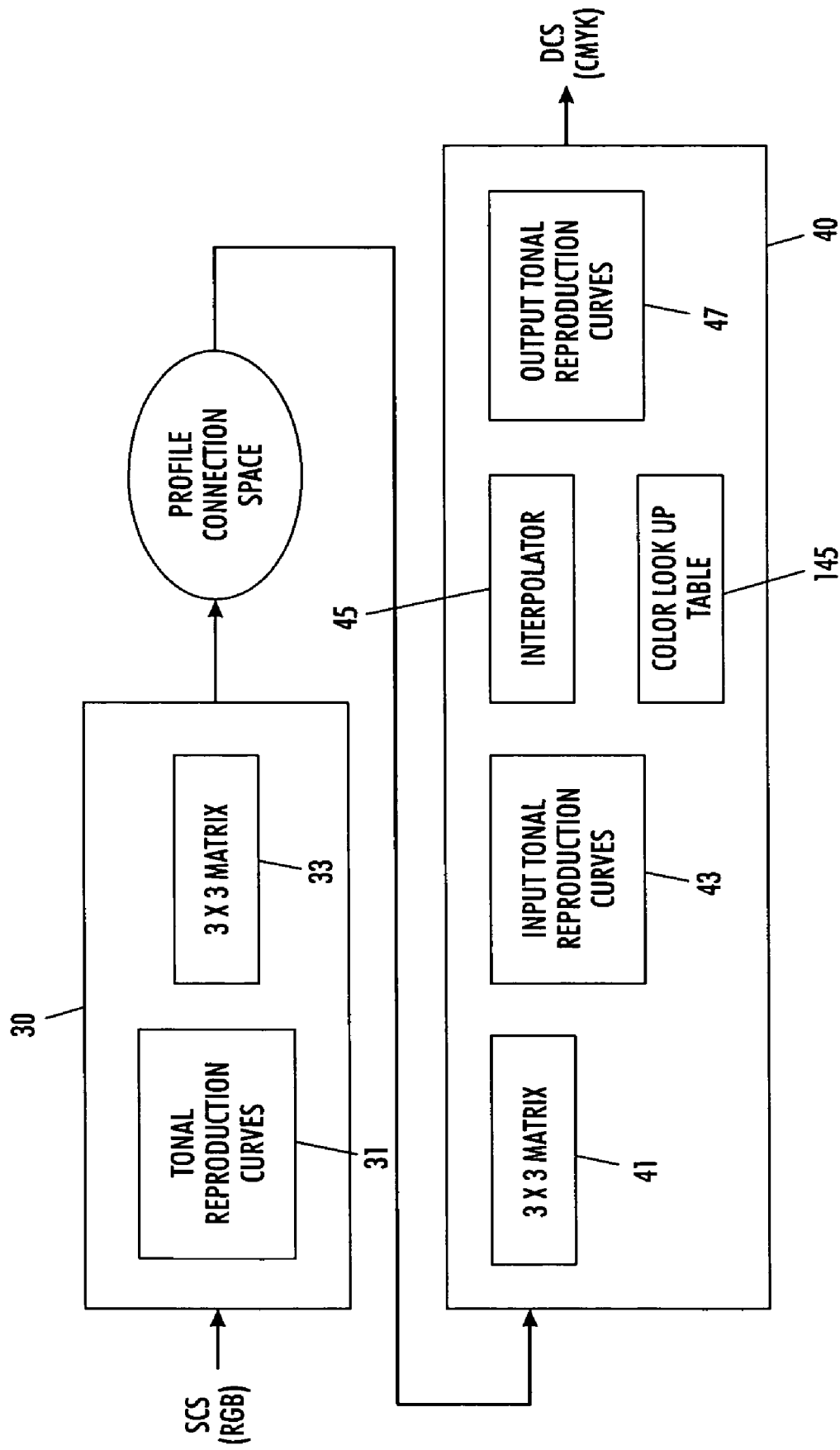
FIG. 2 is a schematic block diagram of an embodiment of a color transform pipeline.

FIG. 2 is a schematic block diagram of an embodiment of a color transform pipeline that can be employed to map or transform source device dependent color space SCS input values to output destination device dependent color space DSC output values. The source device color space SCS can be formatted or configured for a display device such as a color monitor, while the destination device color space DCS can be formatted or configured for a hardcopy apparatus such as a printer. An example of source device color space would be RGB (red-green-blue), while an example of a destination device color space would be CMYK (cyan-magenta-yellow-black). Thus, for example, RGB input color data formatted for a color monitor is mapped or transformed to CMYK output color data that is formatted for a printer.

The color transform pipeline can be implemented in a color management module (CMM) of computer operating system or an application, for example in accordance with an ICC workflow. For ease of reference, this disclosure will be in the context of source device dependent RGB color space and destination device dependent CMYK color space, and it should be appreciated that other color spaces can be employed.

The color transform pipeline includes a device to PCS profile 30 that maps or converts source device dependent color space input values such as RGB values to profile connection space (PCS) values XYZ. The device to PCS profile 30 can employ for example tonal reproduction curves (TRCs) 31 and a 3×3 matrix 33. The TRCs 31 provide adjusted source device color space values that are multiplied by the matrix 33 to produce the PCS XYZ values. The device to PCS profile 30 can be a device specific profile (e.g., for a particular scanner or monitor), or it can be a quasi-standard device color space such as sRGB.

The color transform pipeline further includes a PCS to device profile 40 that maps or converts the PCS values to destination device dependent color output values such as CMYK. The PCS to device profile 40 includes a 3×3 matrix 41, input TRCs 43, an interpolator 45, and output TRCs 47. The 3×3 matrix 41 maps the PCS values to an intermediate destination device color space ICS, the input TRCs 43 adjust the intermediate destination device color values and provides inputs to the interpolator 45 which maps the adjusted intermediate color values to destination device color space values such as CMYK. The destination device color space values can be adjusted pursuant to output TRCs 47 to provide adjusted destination device color space values.

The interpolator 45 employs a color look-up table 145 that contains destination device color values such as CMYK. Each CMYK value in the table can be called a node and comprises the CMYK value for a corresponding location in the TRC adjusted intermediate color space ICS provided by the input TRCs 43. Values between nodes (i.e., CMYK values for adjusted PCS values between the PCS values associated with the nodes) are calculated using interpolation. The PCS to device profile 40 can be specific to a particular printer, for example, and generates the appropriate destination device color space values (e.g., CMYK) that will cause the output device to produce the colors specified by the PCS XYZ data. Since the outputs of the input TRCs are utilized by the interpolator 45 to obtain data from the color look-up table 145, it can be convenient to refer to the outputs of the TRCs as inputs to the color look-up table, and the range of the values of the TRCs can be called an input range. The input TRCs can be implemented as tables and can be called input tables.

The color space of the color look-up table 145 of the PCS to device profile 40 can be aligned with the source device color space SCS, for example wherein the input range of the interpolator 45 corresponds to the range of the source device color space SCS inputs. This can be accomplished, for example, by configuring the 3×3 matrix 41 of the destination device profile 40 to be the inverse of the 3×3 matrix 33 of the source device profile 30, and configuring the input TRCs 43 to be the inverse of the source device TRC's 31. In this manner, the PCS values are multiplied by a matrix 41 that is the inverse of the matrix 33, and results of the multiplication by the matrix 41 are adjusted or linearized by input TRCs 43 that are the inverse of the source device TRC's 31.

The outputs of the input TRCs 43 thus approximately correspond to the input RGB values, comprising for example approximate replicas of the input RGB values or approximate scaled replicas of the input RGB values. In other words, the outputs of the input TRCs 43 can comprise the input RGB values with some error terms introduced by the processing or scaled versions of the input RGB values with some error terms introduced by the processing. By way of illustrative example, the input RGB values can be 8-bit data, while the values of the input TRCs can be 8-bit or 16-bit data. The color look-up table 145 can thus comprise a look-up table that maps RGB values to CMYK values, for example.

The color look-up table 145 of the destination device profile 40 can more particularly be configured as an expanded or buffered color look-up table wherein data contained in the outermost grid points or nodes are replicas of the next to outermost nodes (i.e., the inner nodes that are closest to the outermost nodes). A buffered color look-up table 145 can comprise an inner region or portion and an outer region or portion, wherein the outer portion surrounds the inner portion and comprises replicas of the closest nodes of the inner portion. In other words, the nodes of the outer portion are replicas of the outermost nodes of the inner portion. By way of illustrative example, the outer portion comprises one layer of nodes, such that the indexes or addresses associated with the nodes of the outer portion are spaced from the inner portion outermost nodes they replicate by one grid interval INT along one or more axes, depending on the location of a particular inner portion outermost node.

Figure 3:
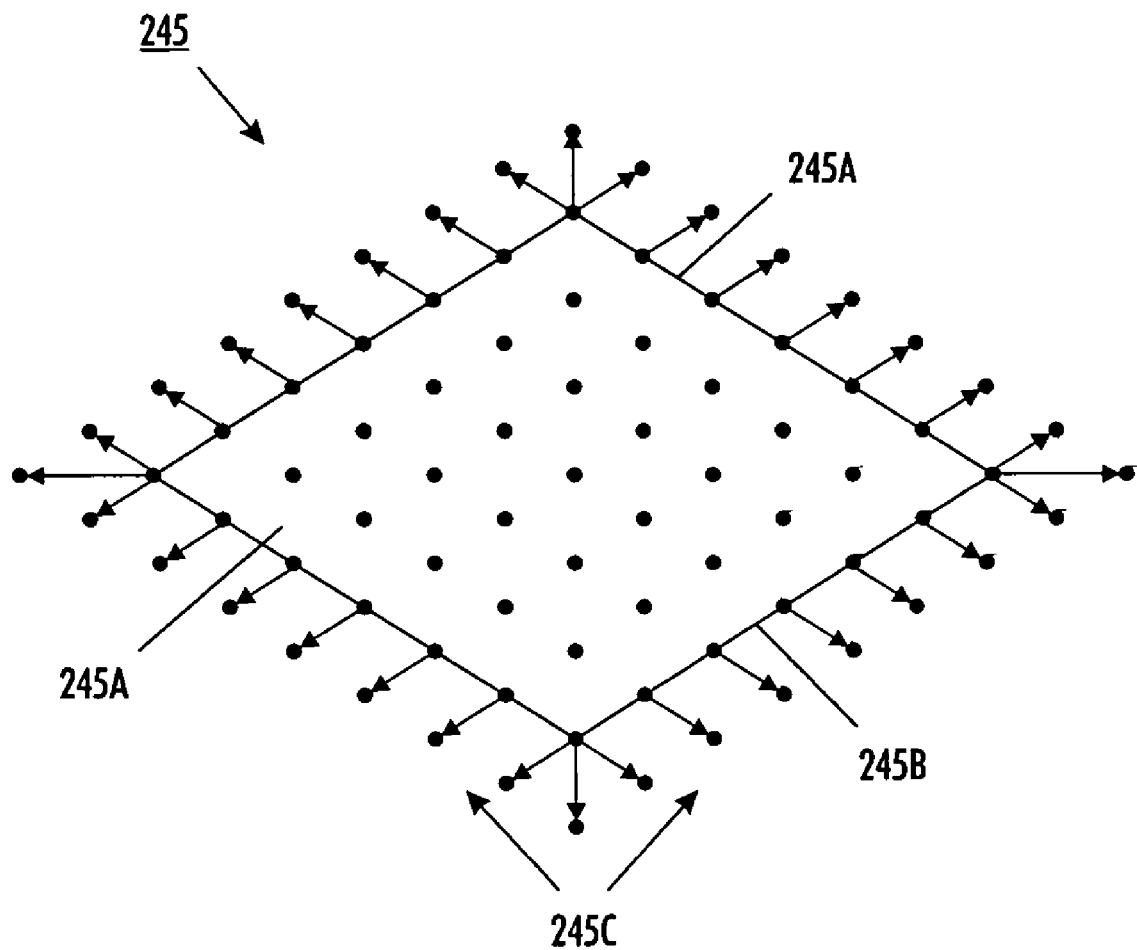
FIG. 3 is a schematic illustration of an embodiment of a 2-dimensional buffered look-up table wherein the outermost nodes are replicas of inner nodes that are closest to the outermost nodes.

FIG. 3 is a schematic depiction of a 2-dimensional buffered look-up table 245 that includes an inner portion 245A comprising nodes on or inside a generally parallelogram shaped reference boundary 245B and an outer portion 245C comprising nodes outside the generally parallelogram shaped boundary 245B and surrounding the inner portion 245A. The nodes of the outer portion 245C replicate the outermost nodes of the inner portion 245A as indicated by arrows leading from outermost nodes of the inner portion 245A to replicating nodes of the outer portion 245C. In other words the data contained in the outermost nodes of the inner portion 245A are replicated in the nodes of the outer portion 245C.

Figure 4:
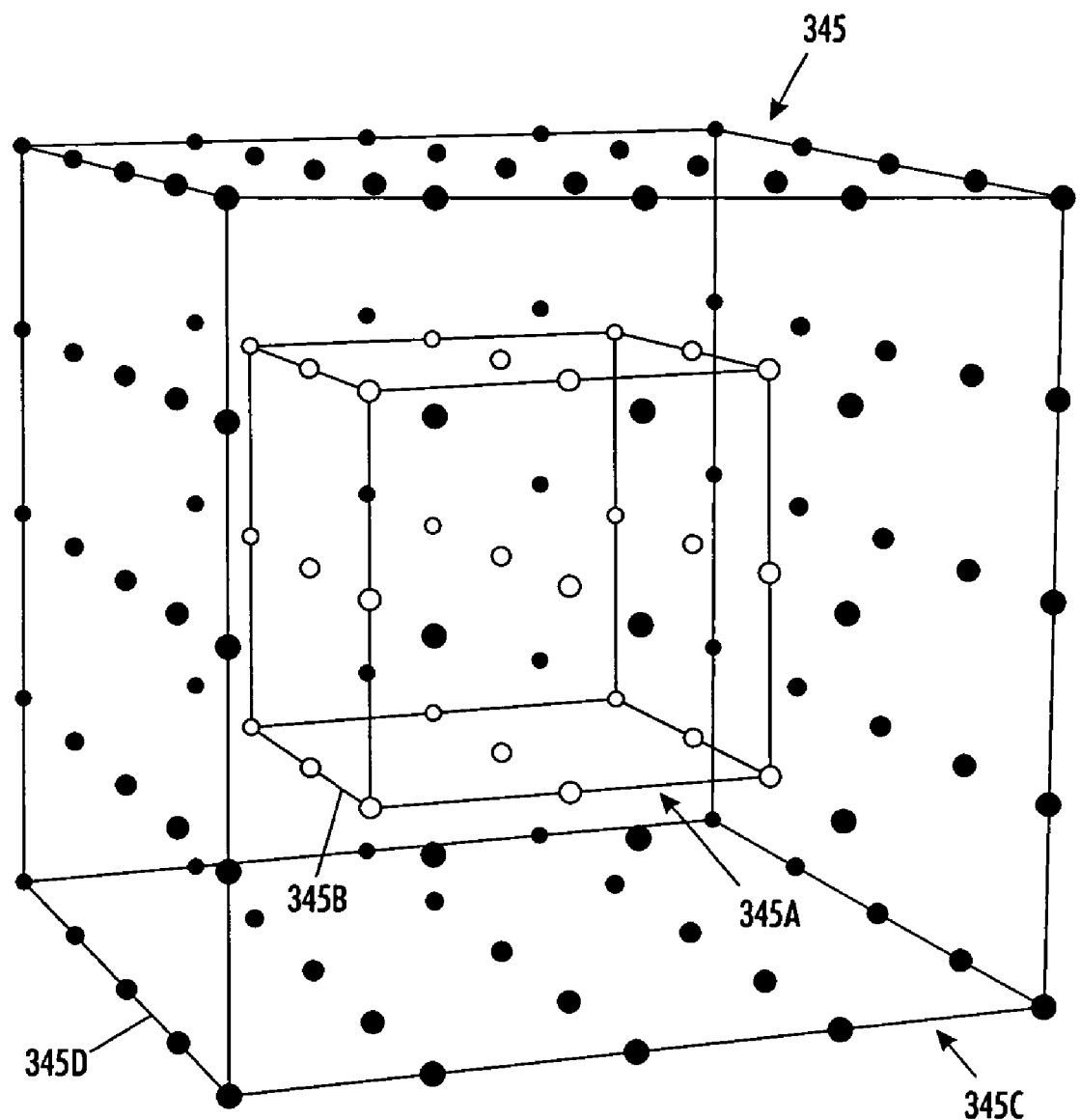
FIG. 4 is a schematic illustration of an embodiment of a 3-dimensional buffered look-up table wherein the outermost nodes are replicas of inner nodes that are closest to the outermost nodes.

FIG. 4 is a schematic perspective representation of a 3-dimensional buffered color look-up table 345 as a 3-dimensional rectilinear grid that includes an inner portion 345A comprising nodes on or inside an inner rectilinear reference box 345B and an outer portion 345C comprising nodes on an outer rectilinear reference box 345D that surrounds the inner portion 345A. The nodes of the inner portion 345A are illustrated as hollow dots, while the nodes of the outer portion are illustrated as solid dots. The solid and hollow dots become smaller with distance from the front surface of the outer rectilinear box 345D. The inner portion nodes that are closest to the nodes of the outer portion 345C are on the rectilinear box 345B and are replicated in the nodes of the outer portion 345C. More particularly, each node at a corner of the inner rectilinear box 345B is replicated at 7 nodes in the outer portion, each node along an edge between corners of the inner rectilinear box 345B is replicated at 3 nodes in the outer portion, and each node on a surface of the inner rectilinear box 345B between edges and corners is replicated at 1 node in the outer portion. A buffered 3-dimensional G×G×G color look-up table thus would have an (G−2)×(G−2)×(G−2) inner portion, for the illustrative example of a single layer outer or buffer portion. The outer portion would have [G×G×G−(G−2)×(G−2)×(G−2)] nodes.

Figure 5:
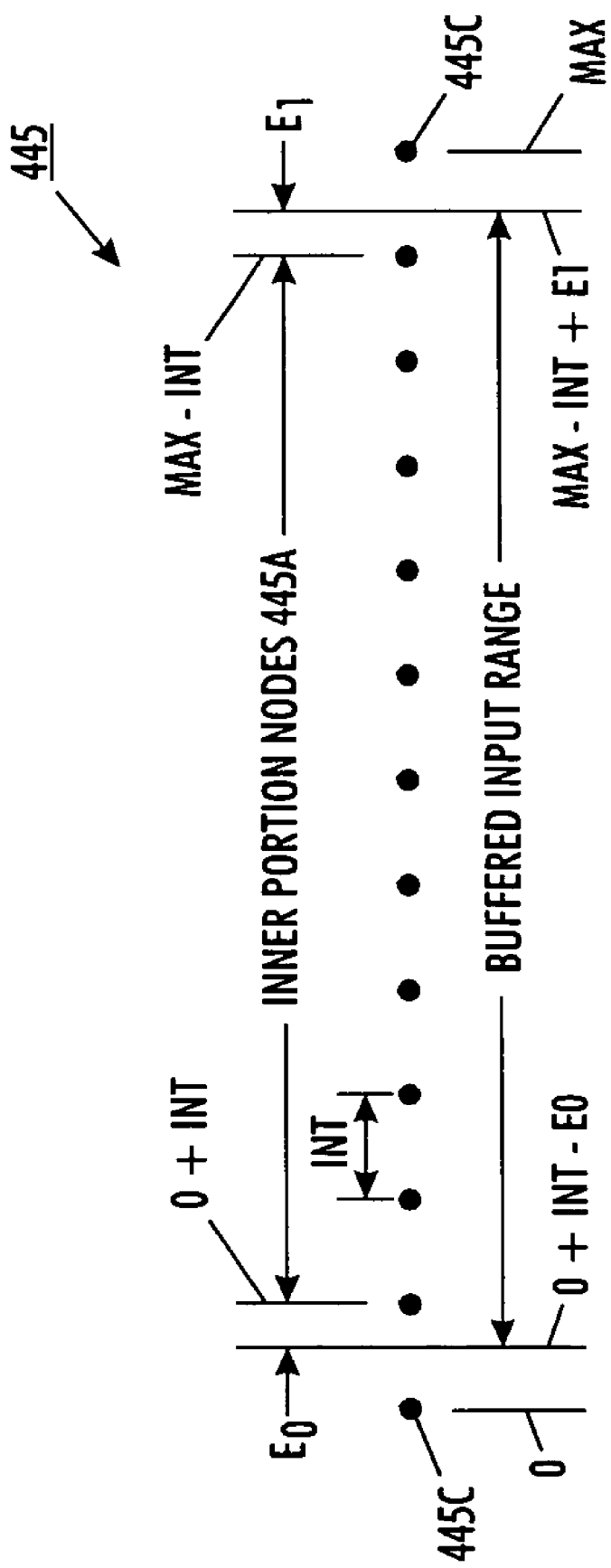
FIG. 5 is a schematic diagram illustrating a buffered input range for a buffered color look-up table.

The indexes or addresses associated with the nodes along each axis of a buffered color look-up table 145 can be 0 to MAX, for example with a substantially constant or uniform grid interval of INT. MAX can be a positive integer and can typically be $2^N-1$, wherein N can be 8 or 16 or 24, for example, depending on the color transform pipeline. For the illustrative example wherein the outermost nodes comprise replicas of the closest inner nodes, a replicated node would have an associated index of 0+INT or MAX−INT along at least one axis, while a replicating node would have an associated index of 0 or MAX along at least one axis, as schematically depicted in FIG. 5 for a representative line of nodes 445 along one dimension of the look-up table.

The input TRCs 43 of the PCS to device profile 40 can be configured to provide inputs to the interpolator 45 that are configured such that the TRC values have a range along each dimension that is less than the look-up table index range of 0 to MAX and greater than the index range of 0+INT to MAX−INT for the inner portion of the look-up table. For example, the TRC values can have a range in each dimension of (0+INT−E0) to (MAX−INT+E1), wherein each of E0 and E1 can be a relatively small number that is less than the look-up table grid interval INT, for example. This concept is schematically illustrated in FIG. 5 for a representative line of nodes 445 along one dimension of the color look-up table. The line comprises inner portion nodes 445A disposed between outer portion nodes 445C. The inner portion nodes 445A comprises a line of nodes of the inner portion of the buffered color look-up table along one dimension, while the outer portion nodes 445C comprise nodes of the outer portion of the buffered color look-up table along one dimension. The outer portion nodes 445C replicate the inner portion nodes 445A that are closest to the outer portion nodes 445C. Such closest nodes are the inner portion nodes 445C that are immediately adjacent the outer portion nodes 445C. The index range for the entire line of nodes is from 0 to MAX, while the index range of the inner portion nodes is from 0+INT to MAX−INT, wherein INT is the grid interval.

Alternatively, the TRC values can have a range in each dimension of 0 through (MAX−INT+E1), or (0+INT−E0) through MAX. In this manner, the input range (i.e., the range of the TRC values) overlaps the inner portion of the look-up table.

Since the ranges of the input TRCs are smaller than the index ranges of the buffered color look-up table 145 and overlap the inner portion of the buffered color look-up table 145, calculation errors are buffered such that requests for a primary output color tends to consistently result in a primary output color. This is because an input to the interpolator that is outside the inner portion of the buffered color look-up table will produce an interpolator output that is the same output for an input that is on the outer surface of the inner portion of the buffered color look-up table.

The re-scaled input TRCs 43 and the buffered color look-up table 145 can be generated by first generating input TRCs and a color look-up table that are not buffered and have an index range of 0 to MAX. The color look-up table is expanded to include outermost nodes that replicate what were outermost nodes in the originating color look-up table, while the input TRCs are scaled to have a range that extends slightly beyond the nodes of the expanded or buffered look-up table that correspond to the original color look-up table.

Figure 6:
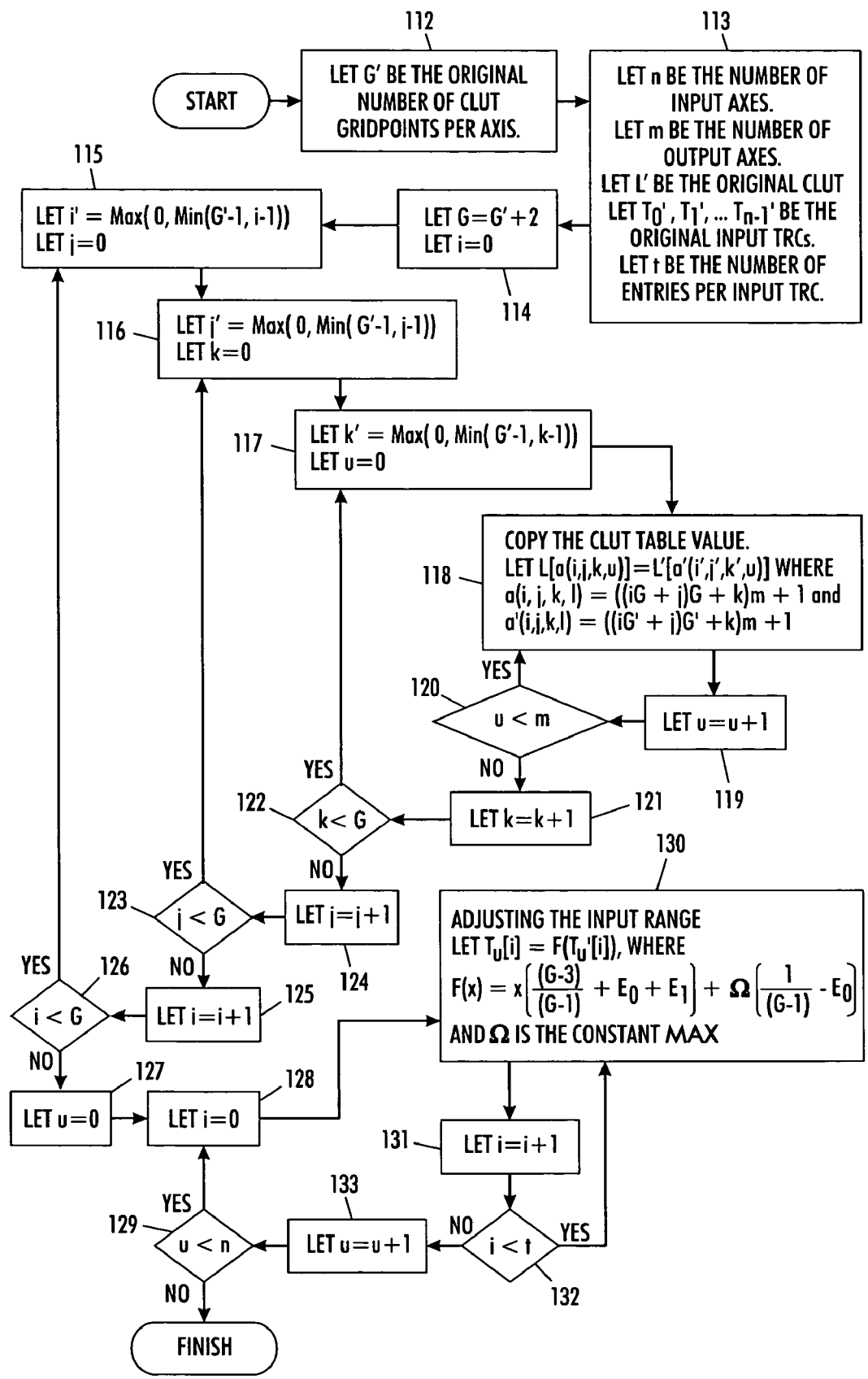
FIG. 6 is a schematic flow diagram of an embodiment of a procedure for generating a buffered color look-up table and scaled input tonal reproduction curves.

FIG. 6 sets forth a schematic flow diagram of an embodiment of a procedure for generating a buffered G×G×G color look-up table (CLUT) from a (G−2)×(G−2)×(G−2) color look-up table that is configured for example to map input RGB values to output CMYK values, and for scaling input TRCs. The originating CLUT is stored in an array or table L, while the buffered CLUT is stored in an array or table L'. The originating input TRCs are in input arrays or tables Tu' while the scaled TRCs are in input arrays or tables Tu. Each of the originating and scaled input TRCs includes t values.

At 112 the number of nodes of the originating CLUT along each axis or dimension is specified by the variable G'.

At 113 n is set to the number of input axes for the originating and buffered CLUTs which is 3 for this embodiment, m is set to the number of output axes (i.e., the output dimension), and the originating CLUT is stored as a single dimensional array L' of size $(G')^3 m$. Each element in the array L' is a non-negative scalar value. Ti' is the originating input TRC of t values for the i'th axis, and each originating TRC value can be a non-negative scalar value less than or equal to the constant MAX.

At 114, G is set to the number of nodes per axis for the buffered CLUT, and the first index counter i for the buffered CLUT is initialized to 0. The buffered CLUT will have an extra 2 nodes per axis and thus G=G'+2.

At 115 the value of i' is computed from i using the equation i'=Max(0,Min(G'−1,i−1)), wherein i' is the first index counter for the originating CLUT. Also, the second index counter j for the buffered CLUT is initialized to 0.

At 116 the value of j' is computed from j using the equation j'=Max(0,Min(G'−1,j−1)), wherein j' is the second index counter for the originating CLUT. Also, the third index counter k for the buffered CLUT is initialized to 0.

At 117 the value of j' is computed from j using the equation j'=Max(0,Min(G'−1,j−1)), wherein j' is the second index counter for the originating CLUT. Also, the output dimension counter u is initialized to 0. The originating and buffered CLUTs have the same output dimension, and therefore will use the same output dimension counter.

At 118 the buffered CLUT L is populated. The inner nodes of the originating CLUT are copied into the buffered CLUT only once, while nodes on the outer surface of the originating CLUT are copied into the buffered CLUT multiple times. The buffered CLUT array L can be a single dimensional array of size $(G)^3 m$. The arrays L and L' can be accessed through respective multi-dimensional hash functions a and a', for example in accordance with an industry standard packing order.

At 119 the output dimension counter u is incremented by 1.

At 120 u is compared to m. This is the flow control for the output dimension counter loop. If u<m, processing continues at 118. Otherwise, processing continues at 121.

At 121 the third index counter k is incremented by 1.

At 122 k is compared to G. This is the flow control for the third index counter loop. If k<G, processing continues at 117. Otherwise, processing continues at 124.

At 124 the second index counter j is incremented by 1.

At 123, j is compared to G. This is the flow control for the second index counter loop. If j<G, processing continues at 116. Otherwise, processing continues at 125.

At 125 the first index counter i is incremented by 1.

At 126, i is compared to G. This is the flow control for the first index counter loop. If i<G, processing continues at 115. Otherwise, processing continues at 127.

At 127, the input dimension counter u is initialized to 0.

At 128, the index counter i is initialized to 0.

At 130 the input range of the TRCs is adjusted. $T_0$, $T_1$, and $T_2$ are the new input TRCs, each of which can be a one dimensional array of length t. A scaled input TRC value is computed from an originating input TRC value and placed in the $T_u$ array.

At 131 the index counter i is incremented by 1.

At 132, i is compared to t. This is the flow control for the index counter loop. If i<t, processing continues at 130. Otherwise, processing continues at 133.

At 133 the input dimension counter u is incremented by 1.

At 129 u is compared to n. This is the flow control for the input dimension counter loop. If u<n, processing continues at 128. Otherwise, processing is finished.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of mapping first device dependent color space values to second device dependent color space values, comprising:

using first tonal reproduction curves and a first 3×3 matrix to map first device dependent color space input values to profile connection space values;

using a second 3×3 matrix that is an inverse of the first 3×3 matrix and second tonal reproduction curves that are an inverse of the first tonal reproduction curves to map the profile connection space values to intermediate color space values, wherein a range of the intermediate color space values along each of three dimensions is from (0+INT−E0) to (MAX−INT+E1);

using a G×G×G look-up table to map the intermediate color space values to second device dependent color space output values, wherein the outermost nodes of the G×G×G look-up table comprise replicas of the outermost nodes of a (G−2)×(G−2)×(G−2) inner portion of the G×G×G look-up table; and wherein each of E0 and E1 is greater than 0 and less than a grid interval INT of the G×G×G look-up table along each of three dimensions, wherein MAX is a positive integer, and wherein a range of indexes associated with the G×G×G look-up table along each of three dimensions is 0 to MAX.

2. The method of claim 1 wherein using a second 3×3 matrix comprises using a second 3×3 matrix that is an inverse of the first 3×3 matrix and second tonal reproduction curves that are an inverse of the first tonal reproduction curves to map the profile connection space values to intermediate color space values that comprise approximate replicas of the first device dependent color space input values, wherein a range of the intermediate color space values along each of three dimensions is from (0+INT−E0) to (MAX−INT+E1).

3. The method of claim 1 wherein using a second 3×3 matrix comprises using a second 3×3 matrix that is an inverse of the first 3×3 matrix and second tonal reproduction curves that are an inverse of the first tonal reproduction curves to map the profile connection space values to intermediate color space values that comprise approximate scaled replicas of the first device dependent color space input values, wherein a range of the intermediate color space values along each of three dimensions is from (0+INT−E0) to (MAX−INT+E1).

* * * * *